March 20, 1934.    F. W. SCHARF    1,951,846
SUPPORT FOR ELECTRICAL RESISTANCE ELEMENTS
Filed Nov. 27, 1931
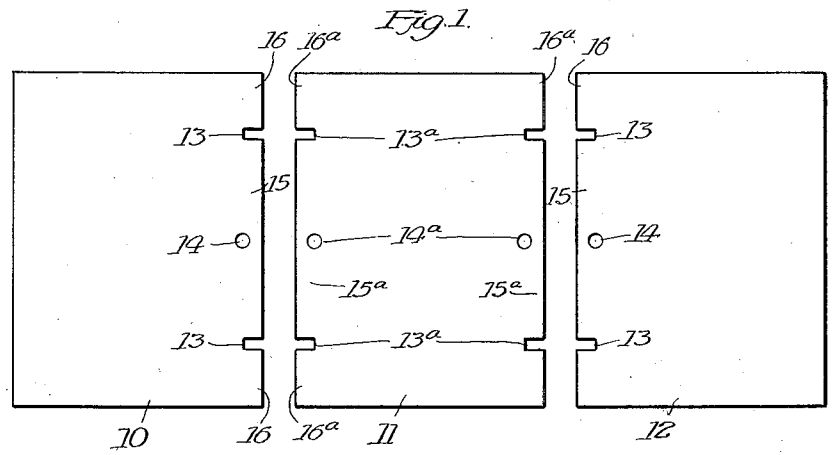
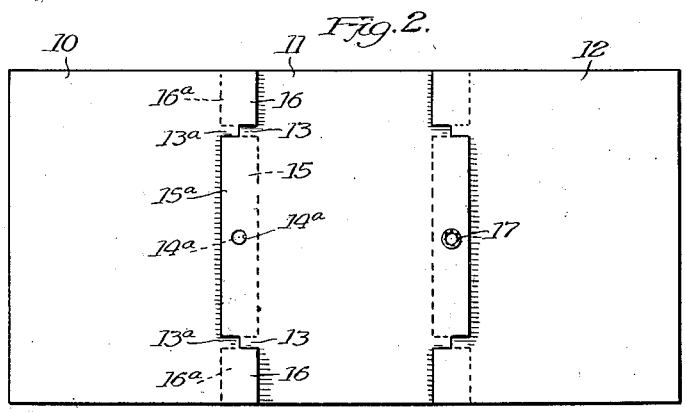
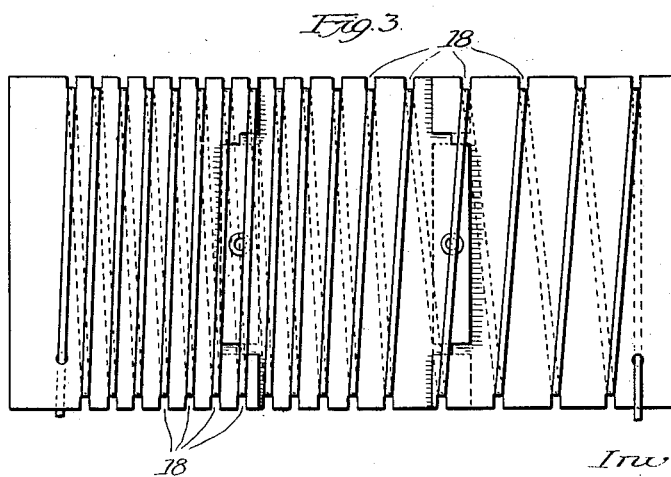
Inventor
Frank W. Scharf Patented Mar. 20, 1934

1,951,846

UNITED STATES PATENT OFFICE 1,951,846

SUPPORT FOR ELECTRICAL RESISTANCE ELEMENTS

Frank W. Scharf, Chicago, Ill., assignor, by mesne assignments, to McGraw Electric Company, Chicago, Ill., a corporation of Delaware Application November 27, 1931, Serial No. 577,500

5 Claims. (Cl. 201—63)

An object of this invention is to provide a satisfactory rigid, efficient and economical means for joining small pieces of insulation, such as mica, in the manufacture of larger supports for the conductors for electric toasters, and the like.

This and other objects, as will hereinafter appear, are accomplished by this invention which is fully described in the following specification and shown in the accompanying drawing, in which—

Figure 1 is a front elevation of three disassembled pieces of mica cut and punched for assembling according to this invention;

Fig. 2 shows the same pieces assembled and riveted; and

Fig. 3 shows the support notched for the conductor wire and wound with the same.

The embodiment illustrated comprises three separate sheets of mica, 10, 11, 12. The two end sheets 10 and 12 are similar and have notches 13, and a hole 14 on a line through the bottom of the notches and midway between them. The central sheet 11 has its two opposite sides similarly formed with registering notches 13$^a$ and holes 14$^a$. The notches thus form a central portion 15 and lateral portions 16 in each indented side of the end sheets 10 and 12, while these corresponding portions of the sheet 11 are lettered 15$^a$ and 16$^a$ respectively.

To interlock these sheets they are reversely bent and are brought together, as shown in Fig. 2, with the lateral portions 16 above the corresponding portions 16$^a$ and the central portion 15 beneath the central portion 15$^a$, the bottoms of the notches 13 and 13$^a$ touching. In this position, the hole 14 then registers with the hole 14$^a$. A rivet 17, preferably hollow, may then be inserted and set securing the parts together.

The mica support may be provided, either before or after assembling, with notches 18 to receive a flat resistance wire 19, which is wound thereon, and serves as a heating element when connected to a suitable source of electricity. Because of the great cost of a large piece of mica for this purpose, various methods have been devised to join small pieces, but none heretofore has been satisfactory due usually to the fact that they buckled when heated. This form has shown itself to be very desirable in use, and enables small pieces of mica to be thus joined to produce a rigid, flat support for a resistance at low cost.

While I have shown and described but a single embodiment of my invention, it is to be understood that it is capable of many modifications. Changes, therefore, in the construction and arrangement may be made which do not depart from the spirit and scope of the invention as disclosed in the appended claims.

I claim:

1. A support for electrical resistance element comprising a plurality of thin sheets similarly notched near the edges on adjacent sides so that the portions between said notches and the lateral portions outside the notches are reversely deflected so as to interengage to form overlapping portions, and a rivet extending through an overlapping portion to secure the sheets together.

2. A support for electrical resistance element comprising a plurality of thin sheets of mica similarly notched near the edges on adjacent sides so that the portions between said notches and the lateral portions outside the notches are reversely deflected so as to interengage to form overlapping portions, and a rivet extending through an overlapping portion to secure the sheets together.

3. A support for electrical resistance element comprising a plurality of thin sheets similarly notched near the edges on adjacent sides so that the portions between said notches and the lateral portions outside the notches are reversely deflected so as to interengage to form overlapping portions, and a rivet extending through the middle overlapping portions to secure the sheets together.

4. A support for electrical resistance element comprising a plurality of thin sheets of mica similarly notched near the edges on adjacent sides so that the portions between said notches and the lateral portions outside the notches are reversely deflected so as to interengage to form overlapping portions, and a rivet extending through the middle overlapping portions to secure the sheets together.

5. An article of commerce comprising two sheets of mica having matched edges adapted to interengage, the edge of each sheet having two spaced notches defining central and end portions so that by oppositely deflecting the central and end portions of one sheet it may be engaged with corresponding portions of the other sheet in overlapping relation, said sheets having holes adapted to register in such overlapping relation for the insertion of a rivet to secure them together.

FRANK W. SCHARF.